3,370,065
CONVERTING CRUDE POLYHALOCOPPER
PHTHALOCYANINES INTO A PIGMENT
FORM
Eberhard Nold, Ludwigshafen (Rhine), and Rudolf
Polster, Frankenthal, Pfalz, Germany, assignors to
Badische Anilin- & Soda-Fabrik Aktiengesellschaft,
Ludwigshafen (Rhine), Germany
No Drawing. Filed Sept. 21, 1966, Ser. No. 580,909
Claims priority, application Germany, Sept. 30, 1965,
B 83,947; Apr. 9, 1966, B 86,603, B 86,606
4 Claims. (Cl. 260—314.5)

ABSTRACT OF THE DISCLOSURE

Conversion of crude polyhalocopper phthalocyanines to pigment dyes with 92–100% strength sulfuric acid and an inert organic liquid together with a small amount of nitrosylsulfuric acid, sodium or potassium nitrite, or nitric acid at 20–180° C.

---

Polyhalocopper phthalocyanines are formed in synthesis in a form which is unsuitable for use as pigment dyes. Various methods are known for converting the crude dyes into useful pigment dyes, i.e. into a finely divided and stable form. For example the crude phthalocyanine may be dissolved or suspended in sulfuric acid and precipitated in finely divided form by pouring into water. It is also possible to convert the dye into a suitable pigment form by kneading in the presence of organic or inorganic substances or by grinding with inorganic salts. The results of the prior art methods are however often unsatisfactory, especially as regards the purity of the pigments; moreover they can usually only be used with advantage for crude dyes obtained in a particular way.

We have now found that the conversion of crude polyhalocopperphthalocyanines into high-grade pigments proceeds in a particularly advantageous manner when the crude dye is treated with sulfuric acid and an organic liquid in the presence of about 0.1 or 0.2 to 2, preferably 0.5 to 1.5, parts by weight of nitrosylsulfuric acid (to 1 part by weight of dye) or in the presence of the corresponding amount of a salt of nitrous acid or in the presence of 0.01 to 0.3 part by weight of nitric acid (reckoned as 100% and to 1 part by weight of dye).

It is advantageous to use 92% to 100% sulfuric acid, preferably 96% to 98%, in the process according to this invention. The ratio by weight of sulfuric acid to nitrosylsulfuric acid should be from 10:1 to 1:1, preferably 6:1 to 4:1; the present invention is however not limited to the said ranges.

For the formation of 0.1 or 0.2 to 2 parts by weight of nitrosylsulfuric acid (per 1 part by weight of dye), about 0.05 or 0.1 to 1.0 parts by weight of sodium nitrite or about the same weight of potassium nitrite (per part by weight of dye) is required. For example the nitrite may be suspended in the organic liquid which is then added to the sulfuric acid or the sulfuric acid may be allowed to flow into the suspension. The nitrite may also be strewed into the sulfuric acid which is stirred well with the organic liquid which is advantageously already present.

The ratio by weight of sulfuric acid to nitric acid should in general be 200:1 to 20:1, preferably 100:1 to 33:1. Within the said range of 0.01 to 0.3 part by weight, 0.05 to 0.1 part by weight is preferred. The nitric acid may be added to the reaction mixture in dilute to highly concentrated form. It is advantageous to use the commercial concentration, about 98%. Instead of nitric acid, about the equivalent amount of salts of nitric acid, for example sodium nitrate, potassium nitrate or calcium nitrate, may be united with the sulfuric acid. In this case about 0.01 to 0.3, preferably 0.05 to 0.1, part by weight to 1 part by weight of dye is advantageously used.

The term "organic liquids" as used herein includes the organic solvents used in experimental chemistry or chemical engineering which are liquid at room temperature or at the working temperature and are not detrimentally affected by nitrosylsulfuric acid during the conversion of the dye. Chlorinated or nitrated hydrocarbons are particularly suitable. Among these, aromatic hydrocarbons are preferred to aliphatic or cycloaliphatic hydrocarbons. Examples are: o-dichlorobenzene, trichlorobenzene, nitrobenzene, chloroform, carbon tetrachloride or mixtures of these or other organic liquids. The mixtures may also contain solvents which are solid at room temperature, for example p-dichlorobenzene or naphthalene. The amount of the organic liquid may be varied wtihin a wide range. The recommended lower limit is the minimum amount required to wet the dry crude dye, for example 0.5 to 1 part by weight of solvent to 1 part by weight of pigment.

The total amount of liquid, i.e. sulfuric acid, organic liquid and nitrosylsulfuric acid or nitric acid, depends on mechanical and economical requirements. For example if the crude dye is to be converted into the pigment form with stirring, the mixture should be easily stirrable. For treatment in ball mills or by shaking, a more mobile consistency of the conversion mixture is desirable. Another possibility for subjecting the conversion material to mechanical action is allowing the mixture to boil under reflux at atmospheric pressure or at subatmospheric pressure, but if the amount of liquid is too large, the economy of the process is decreased because the duration of the treatment is extended too much and the amounts of liquid which are required and have to be worked up are too large. The most suitable amount of liquid in each case may be determined on an aliquot portion of the charge.

When it is desired to start from a nitrate instead of nitric acid, it may be suspended in the organic liquid and the suspension may be added to the sulfuric acid or the sulfuric acid may be allowed to flow into the suspension. The nitrate may also be scattered into the sulfuric acid which is well stirred with the organic liquid which is advantageously already present.

The period of treatment required depends (other conditions being constant) substantially on the temperature which is in general in the range of from 60° to 160° C., preferably from 90° to 130° C. The temperature range of 90° to 180° C., preferably 120° to 160° C., is particularly recommended when using nitric acid or nitrates. As a rule, the period during which these temperatures are maintained may be from ten minutes to two hours. The desired end point of the conversion may be determined on an aliquot portion of a charge or on a withdrawn sample; for example the end point is reached when a coat or drawdown of paint shows no detectable change in purity or depth of color as compared with a sample taken earlier. Naturally the period of treatment is longer at lower temperatures, for example 20° C. The principle of formation which plays a part in the conversion into the pigment form by the process according to this invention is sometimes referred to as acid swelling.

Polyhalocopper phthalocyanines having an average of 15 or 15½ to 16 halogen atoms in the molecule, such as hexadecachlorocopper phthalocyanine or hexa- or pentadecahalocopper phthalocyanines having 1 to 15 chlorine atoms and 15 to 1 bromine atoms in the molecule are for example suitable for conversion according to this invention. It is immaterial whether the crude dye has been obtained by halogenation of copper phthalocyanine or by cyclizing tetrahalophthalic anhydride or tetrahalophthalodinitrile. If the crude dye has been obtained by cyclization of tetrahalophthalic anhydride or tetrahalophthalodinitrile in an organic solvent, it is a particularly advantageous embodiment of the process to add the mixture of sulfuric acid and nitrosylsulfuric acid and the said other nitrogen compounds after the end of the synthesis and to allow the conversion to take place in this mixture.

On the other hand it is possible, but not necessary, to isolate the crude dye, obtained by synthesis, in the dry, finely divided form and to unite it with the liquid required for the conversion. It is advantageous first to wet the crude dye with the organic liquid and then to allow the mixture of acids to flow in slowly. When starting from moist press cakes or flushed pastes of the crude dye, correspondingly more highly concentrated sulfuric acid or less or no additional organic liquid is used. When starting from press cakes, it is advantageous to add the organic liquid to them, to distill off the water and to add the acid mixture. In this and in the flushing it is advantageous to use organic liquids which under the conditions of the conversion are stable to nitrosylsulfuric acid, nitrous acid or nitric acid and therefore can also be used in the subsequent process of this invention as the organic liquid.

For working up, it is usual to add water to the conversion mixture, to wash out the acid and to isolate the pigment by a conventional method, for example by filtration and washing with acetone or dimethylformamide and water or by passing in steam and removing the solvent.

The pigments obtained are distinguished by a yellowish green shade and particular purity of color.

The invention is illustrated by the following examples. The parts are by weight.

*Example 1*

100 parts of hexadecachlorocopper phthalocyanine (which has been prepared by chlorination of copper phthalocyanine in a melt of aluminum chloride) is suspended in 1000 parts of trichlorobenzene and heated to 110° C., and a mixture of 460 parts of concentrated sulfuric acid and 94 parts of nitrosylsulfuric acid is allowed to flow in. The whole is stirred for an hour at 110° C., cooled to 80° C., diluted with water and the acid substantially washed out. The trichlorobenzene is removed with steam and the pigment is suction filtered, washed with water and dried. 90 parts of hexadecachlorocopper phthalocyanine is obtained which has a more yellow shade and enhanced purity of color as compared with the product prepared without adding nitrosylsulfuric acid.

An equally good pigment is obtained by subjecting to the same treatment a crude pigment obtained from tetrachlorophthalic anhydride or tetrachlorophthalodinitrile. When a hexabromodecachlorocopper phthalocyanine is given the same treatment it is obtained in a pronounced yellowish shade.

*Example 2*

18 parts of hexadecachlorocopper phthalocyanine is suspended in 180 parts of chloroform, heated to 60° C. and a mixture of 70 parts of concentrated sulfuric acid and 11 parts of nitrosylsulfuric acid is dripped in. The mixture is boiled under reflux for one hour, cooled to room temperature and washed with dimethylformamide and water.

The pigment obtained is more yellow and purer than a product obtained by swelling with sulfuric acid.

An equally good pigment is obtained by using carbon tetrachloride as the solvent.

*Example 3*

A mixture of 430 parts of trichlorobenzene and 4.8 parts of copper(I) chloride is saturated with gaseous ammonia at room temperature, 42.6 parts of tetrachlorophthalodinitrile and 0.5 part of molybdenum trioxide is added and the whole is boiled under reflux for two hours. It is cooled to 120° C., a mixture of 70 parts of concentrated sulfuric acid and 11 parts of nitrosylsulfuric acid is added and the whole is stirred for half an hour at 100° to 120° C. It is then cooled to room temperature, water is added, the pigment is suction filtered and washed with dimethylformamide and water.

34 parts of a yellowish green pigment is obtained having outstanding purity.

*Example 4*

100 parts of hexadecachlorocopper phthalocyanine is suspended in 800 parts of trichlorobenzene. The suspension is heated to 110° C., 450 parts of 96% sulfuric acid is poured in, 21.5 parts of crystalline sodium nitrite is added and the whole is stirred for one hour at 110° C. It is then poured into 1000 parts of ice water, washed until substantially free from acid and the trichlorobenzene is distilled off with steam. The aqueous pigment suspension is suction filtered while hot and the pigment is washed with hot water and dried. 85 parts of hexadecachlorocopper phthalocyanine is obtained which has a more yellow shade and increased purity of color as compared with the product prepared without adding sodium nitrite.

*Example 5*

100 parts of crude polychlorocopper phthalocyanine, obtained by cyclization of tetrachlorophthalic anhydride, is suspended in 800 parts of trichlorobenzene and heated to 150° C. A mixture of 500 parts of 92% sulfuric acid and 7 parts of 98% nitric acid is allowed to flow in, and the whole is stirred for one hour at 150° to 155° C. and then poured into cold water. After the acid has been substantially washed out, the trichlorobenzene is removed with steam, and the pigment is suction filtered, washed with water and dried. 90 parts of polychlorocopper phthalocyanine of adequate purity or 70 parts of very high purity is obtained having a yellower shade than a pigment obtained by chlorination of copper phthalocyanine followed by swelling with sulfuric acid alone.

A similar result is obtained by using 8 parts of sodium nitrate instead of 7 parts of concentrated nitric acid. The nitrate is advantageously introduced into the suspension of dye, trichlorobenzene and sulfuric acid.

It is once again stated that the essential feature of the process according to the present invention for the conversion of crude polyhalocopper phthalocyanines into polyhalocopper phthalocyanine pigments consists in treating the starting material with certain oxygen compounds of nitrogen in the presence of sulfuric acid and a liquid organic medium. These oxygen compounds of nitrogen include nitrosylsulfuric acid, nitric acid, nitrous acid and the corresponding inorganic salts. It goes without saying that mixtures of the oxygen compounds of nitrogen may also be used. The term "halo" in polyhalocopper phthalocyanines is intended to denote chlorine and bromine.

We claim:

1. A process for the conversion of crude polyhalocopper phthalocyanine having a total of from 15 to 16 halogen atoms selected from the group consisting of chlorine and bromine per molecule into pigment with sulfuric acid and an inert organic liquid as the conversion medium, wherein said crude dye is treated in sulfuric acid of 92 to 100% strength together with an inert organic liquid in the presence of 0.1 to 2 parts by weight of nitrosylsulfuric acid or of 0.05 to 0.1 part by weight of sodium nitrite or potassium nitrite or of 0.01 to 0.3 part by weight of nitric acid, reckoned as 100%, for each part by weight of crude dye, at a temperature of between 20° C. and 180° C. until the desired pigment dye form has been obtained.

2. A process as claimed in claim 1, wherein the nitric acid is formed in situ in said conversion medium by adding an appropriate amount of sodium nitrate, potassium nitrate or calcium nitrate.

3. A process as claimed in claim 1 wherein the crude polyhalocopper phthalocyanine is a synthesis mixture obtained by cyclization of tetrahalophthalic anhydride or tetrahalophthalodinitrile in an organic solvent.

4. A process as claimed in claim 1, wherein 0.1 to 2 parts by weight of nitrosylsulfuric acid is employed.

References Cited

UNITED STATES PATENTS

| | | | |
|---|---|---|---|
| 3,293,262 | 12/1966 | Pugin | 260—314.5 |
| 3,252,991 | 5/1966 | Schmidt et al. | 260—314.5 |
| 2,556,727 | 6/1951 | Lane et al. | 260—314.5 |

FOREIGN PATENTS 925,379   5/1963   Great Britain.

NORMA S. MILESTONE, *Acting Primary Examiner.*

WALTER A. MODANCE, *Examiner.*

H. I. MOATZ, *Assistant Examiner.*